(12) United States Patent
Svejcar et al.

(10) Patent No.: US 11,796,073 B2
(45) Date of Patent: Oct. 24, 2023

(54) SIX PORT VALVE

(71) Applicants: Kyle Svejcar, Itasca, IL (US); James Pearson, Itasca, IL (US)

(72) Inventors: Kyle Svejcar, Itasca, IL (US); James Pearson, Itasca, IL (US)

(73) Assignee: Robertshaw Controls Company, Itasca, IL (US)

( * ) Notice: Subject to any disclaimer, the term of this patent is extended or adjusted under 35 U.S.C. 154(b) by 87 days.

(21) Appl. No.: 17/580,156

(22) Filed: Jan. 20, 2022

(65) Prior Publication Data
US 2022/0243828 A1 Aug. 4, 2022

Related U.S. Application Data

(60) Provisional application No. 63/145,136, filed on Feb. 3, 2021.

(51) Int. Cl.
| | | |
|---|---|---|
| F16K 11/065 | (2006.01) | |
| F16K 11/074 | (2006.01) | |
| F16K 11/085 | (2006.01) | |

(52) U.S. Cl.
CPC ........ F16K 11/065 (2013.01); F16K 11/0743 (2013.01); F16K 11/085 (2013.01)

(58) Field of Classification Search
CPC ... F16K 11/065; F16K 11/0743; F16K 11/085
See application file for complete search history.

(56) References Cited

U.S. PATENT DOCUMENTS

| | | | | |
|---|---|---|---|---|
| 2,129,231 A | * | 9/1938 | Parker | F16K 11/0856 137/625.29 |
| 3,195,726 A | * | 7/1965 | Saurenman | E04H 4/12 137/625.68 |
| 3,521,673 A | * | 7/1970 | Gruner | F16K 11/065 137/625.29 |
| 4,188,974 A | * | 2/1980 | Roger | F16K 11/065 137/625.48 |
| 4,355,659 A | * | 10/1982 | Kelchner | F16K 11/0856 137/625.19 |
| 4,602,657 A | * | 7/1986 | Anderson, Jr. | G01F 15/185 73/1.61 |
| 4,655,252 A | * | 4/1987 | Krumhansl | F16K 11/0853 251/59 |
| 4,714,551 A | * | 12/1987 | Bachhofer | B01D 29/668 210/279 |
| 4,921,598 A | * | 5/1990 | Desch | C02F 1/42 210/190 |
| 4,968,334 A | * | 11/1990 | Hilton | B01D 53/0407 96/124 |
| 5,057,214 A | * | 10/1991 | Morris | B01D 29/668 210/278 |
| 5,084,031 A | * | 1/1992 | Todd | A61B 5/02158 137/595 |

(Continued)

*Primary Examiner* — Craig M Schneider
*Assistant Examiner* — Christopher D Ballman
(74) *Attorney, Agent, or Firm* — Miller & Martin PLLC; Stephen J. Stark

(57) ABSTRACT

A multi-port valve provides three inlets and three outlets. In many embodiments, seven flow configurations are provided. A stemshell can rotate internal to a housing to direct fluid from specific inlets to specific outlets while saving flow through various inlet/outlet ports as required by the various flow configurations.

18 Claims, 7 Drawing Sheets

(56) References Cited

U.S. PATENT DOCUMENTS

| | | | | |
|---|---|---|---|---|
| 5,437,304 | A * | 8/1995 | Delcroix | B29C 35/007 |
| | | | | 137/625.18 |
| 5,937,903 | A * | 8/1999 | Afshar | F16K 11/0856 |
| | | | | 210/278 |
| 6,308,739 | B1 * | 10/2001 | Barbuto | F16K 5/0478 |
| | | | | 137/625.11 |
| 6,568,428 | B2 * | 5/2003 | Pecci | F16K 27/003 |
| | | | | 137/595 |
| 9,382,833 | B2 * | 7/2016 | Morein | F01P 7/14 |
| 9,435,447 | B2 * | 9/2016 | Wattellier | F16K 11/085 |
| 9,500,299 | B2 * | 11/2016 | Morein | F16K 11/0876 |
| 9,707,499 | B2 * | 7/2017 | Willis | B01D 29/668 |
| 9,932,724 | B2 * | 4/2018 | Chan | F16K 49/005 |
| 10,337,626 | B2 * | 7/2019 | Takamatsu | F16K 11/076 |
| 11,156,300 | B2 * | 10/2021 | Bunda | F16K 11/0856 |
| 2006/0118066 | A1 * | 6/2006 | Martins | F16K 11/0856 |
| | | | | 123/41.08 |
| 2007/0039653 | A1 * | 2/2007 | Maggard | F16K 11/22 |
| | | | | 137/625.19 |
| 2015/0000327 | A1 * | 1/2015 | Kakehashi | H01M 10/625 |
| | | | | 62/434 |
| 2017/0254425 | A1 * | 9/2017 | Takamatsu | F16K 37/005 |

* cited by examiner

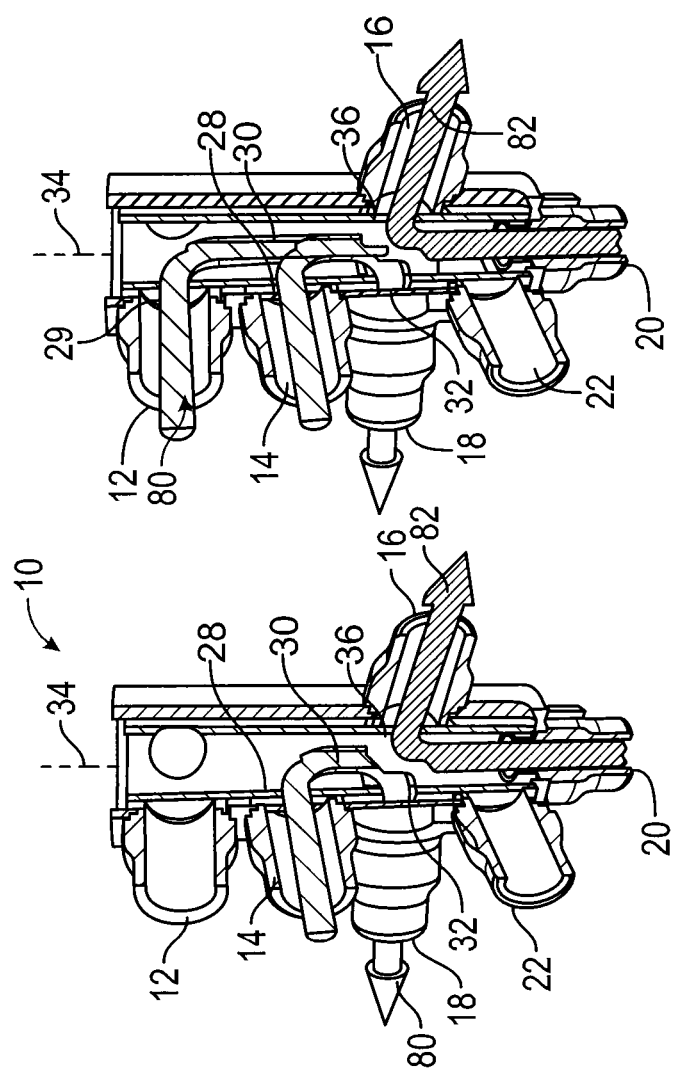

Spindle Position at Various Modes

SIX PORT VALVE

CLAIM OF PRIORITY

This application claims the benefit of U.S. Provisional Application No. 63/145,136 filed Feb. 3, 2021, which is incorporated herein by reference, in it entirety.

FIELD OF THE INVENTION

The present invention relates to a multiport valve such as a six port valve having multiple positions such as seven distinct positions (flow configurations) amongst the various ports such as three inlet and three outlet ports.

BACKGROUND OF THE INVENTION

The applicant was requested by a customer to provide a fluid control valve which could operate in one of seven different flow configurations amongst three inlet ports and three outlet ports. Specifically, the inlet ports are numbered 1, 2 and 5, the outlet ports are numbered 3/7, 4/6 and 8. The customer requested that in the first position, inlet port 2 directs flow to outlet port 4/6 while inlet port 5 directs flow to outlet port 3/7. In the second position, both inlet ports 1 and 2 direct flow to outlet port 4/6, and inlet port 5 directs flow to outlet port 3/7. In the third position, inlet port 1 directs flow to outlet port 4/6, and inlet port 5 directs flow to outlet port 3/7. In the fourth position, inlet port 2 directs flow to outlet port 3/7, and inlet port 5 directs flow to outlet port 4/6. In position five, inlet ports 1 and 2 direct flow to outlet ports 3/7, and inlet port 5 directs flow to outlet port 4/6. In position six, inlet port 1 directs flow to outlet port 3/7, and inlet port 5 directs flow to outlet port 4/6. Finally in position seven, inlet port 2 directs flow to outlet port 3/7, and inlet port 5 directs flow out outlet port 8.

The customer requested male fittings at the ports extending from the valve housing and required an electrical 3 or 4 pin connector per USCAR for control. Space requirements included a need to fit with a space of 50 mm×165 m×70 mm. Flow rates of 10 L/min-40 L/min were anticipated. Temperature range expectation was −30° C. to 110° C. Input pressure was expected to be 250 KPa Back pressure at non-desired flow paths at 0 KPa. Port to port leakage of no more than 5 mL/min when new and 10 mL/min at end of life was specified. Minimum flow coefficient of 14/13 were specified depending on straight or non-straight path flow.

The customer left the applicant to solve this problem.

SUMMARY OF THE INVENTION

It is the object of many embodiments of the present invention to provide an improved six port valve having three inputs and three outputs. This valve is capable of selecting amongst seven specific flow configurations in seven separate positions of the valve.

It is the object of many embodiments of the present invention to provide an improved multi-port valve.

It is another object of many embodiments of the present invention to provide an improved seven position valve, preferably having three inputs and three outputs.

It is another object of many embodiments of the present invention to provide an improved an ability to provide a specific flow path to connect specific inputs to specific outputs, preferably without significant mixing (leakage) of the flow paths in the valve.

It is another object of many embodiments to provide selected positions of a valve to selectively direct specific inputs to specific outputs in a prearranged configuration while selectively securing one of the inputs and not mixing fluid streams internal to valve unless part of the predetermined specified flow path.

Accordingly, in accordance with many embodiments of the present invention, a valve body is provided with a plurality of ports, such as five ports on an exterior cylindrical surface selected from ports 1, 2, 3/7, 4/6 and 8. For many embodiments an additional port (port 5 or other port) may be located along an axis of a circumferential housing.

By rotating an interior director, insert or stemshell, which is preferably machined or otherwise formed, communication between specific ports when placed at specific angular relationships of the stemshell relative to the housing can be achieved while preferably selectively securing one of the inputs for many of the flow configurations. Additionally, specific ports can direct flow from specific inlet ports to specific outlet ports to accomplish multiple such as seven different flow paths depending on the angular position or rotational position of the insert or stemshell relative to the housing.

An insert having at least one if not two or more internal passages, may be utilized at various angular positions to communicate one or more inlet ports with a specific outlet port. Two separate inlet ports may communicate with a single outlet port and a third inlet port may communicate with a different outlet port with the other outlet port having no flow. Other flow positions have an inlet blocked off and an outlet blocked off. Channels and/or bores, such as in or along exterior surfaces external to and/or separate from the internal passage(s) of the insert may be utilized to communicate a specific inlet port with a specific outlet port without inter mixing of multiple fluid streams, unless specifically desired.

Inlet ports may communicate with one of two passages such as central passages through the stemshell in communication with a bore or channel through an exterior surface of the stemshell to direct fluid to an outlet port in communication with the stemshell oriented in a specific rotational or angular position relative to the valve housing.

Separated flow paths may be maintained through the valve based on the angular position of the insert or stemshell which can have an actuator extending outwardly away from the first port and/or along the axis of the housing and/or insert for various embodiments so as to be operated by various electrical, mechanical and/or other actuators as are known in the art.

The applicant can align three or four ports in a common plane and/or space them about a circumference of the housing such as two ports (non-coplanar with the others, and axis of the stemshell) to potentially shorten a length of the valve housing. The two ports, such as outlet ports could be coplanar in a plane perpendicular to the axis of the stemshell.

Other embodiments may incorporate features of this invention with other port combinations and constructions.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 3 is a partial cut away view of the valve in FIGS. 1-2, having a first flow mode;

FIG. 4 is a partial cut away view of the valve in FIGS. 1-2 in a second flow mode;

FIG. 5 partial cut away view of the valve in FIGS. 1-2 in a third flow mode;

DETAILED DESCRIPTION OF THE PREFERRED EMBODIMENT

Figure 1:
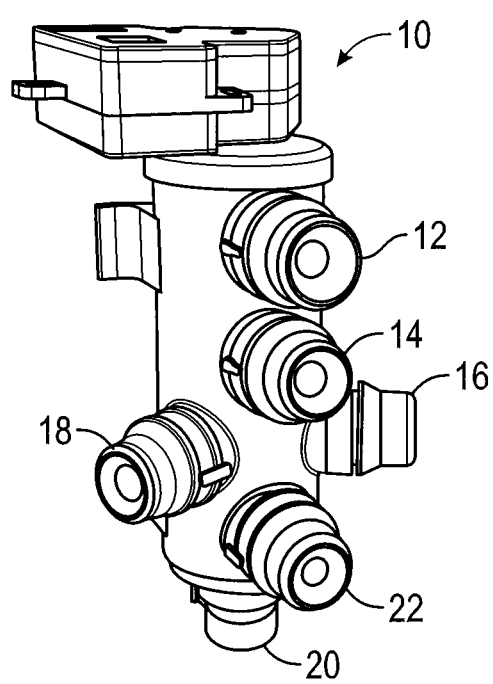
FIG. 1 is a front perspective view of a presently preferred embodiment of a valve of the present invention.
Figure 2:
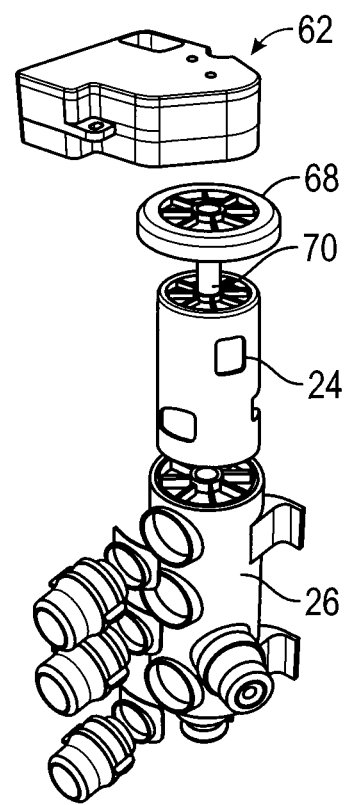
FIG. 2 is an exploded view of the embodiment shown in FIG. 1.

FIG. 1 shows a valve 10 of a presently preferred embodiment. The valve 10 has first, second, third/seventh, fourth/sixth, fifth and eighth ports 12,14,16,18,20,22 respectively. The ports 12-22 for many embodiments are dedicated inlet or outlet ports. Specifically, first port 12, second port 14 and fifth port 20 have been designed as inlet ports for the illustrated embodiment, while third/seventh port 16 fourth/sixth port 18 and eighth port 22 respectively have been designed as outlet ports. Other embodiments may have different inlet/outlet ports and/or ports that may not necessarily be dedicated to only inlet or outlet ports. Various fluids whether liquid and/or gas may flow through various embodiments of valve 10. Many valves 10 of this construction are utilized with ethylene glycol and water mixed fluid to regulate temperatures of components of electric vehicles.

Figure 12:
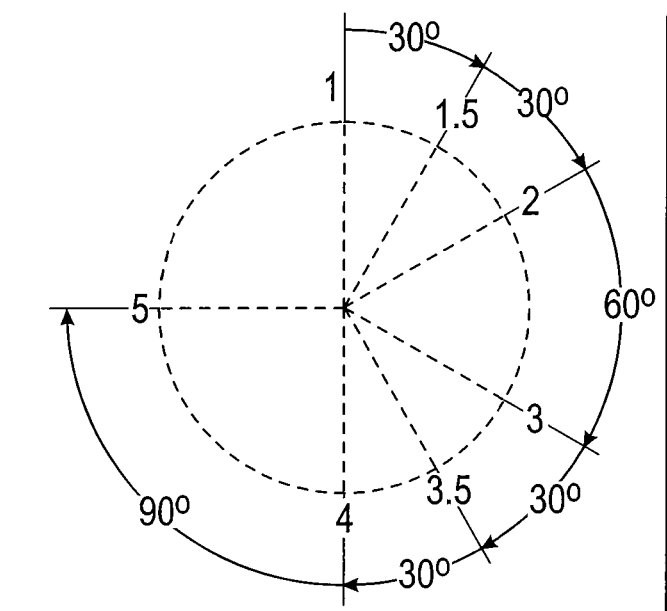
FIG. 12 is a graphical representation of the angular position of the stemshell to achieve the various flow modes of FIGS. 3-9 for the preferred embodiment.

A different position of the stemshell 24 or insert relative to the housing 26 is calculated to provide different flow paths from at least two, if not three of the various inputs 12,14,20 to be directed to two of the three specific outputs 16,18,22. Angular positions for the preferred embodiment for the stemshell 24 to produce the seven modes of flow are shown in FIG. 12. Other angular positions could be utilized with other embodiments.

The stemshell 24 is preferably substantially cylindrical in nature and may selectively communicate one or more of three inlet ports such as inlet ports 12,14,20 along the housing 26 to two of the specific outlets three/seventh 16, fourth/sixth 18 or eighth 22 along two separated flow paths 80,82.

Channels, bores and internal passages in stemshell 24 are useful to communicate specific inlet ports 12,14,20 with specific outlet ports 16,18,22.

FIG. 3 shows a first mode of flow (Mode 1) which could be utilized in cooling portion(s) of an electric vehicle or for other purposes. Specifically, flow from the second port 14 passes into the valve 10 as directed by stemshell 24 such as through first bore 28 into internal passage 30 as first flow path 80 and out second bore or channel 32 to fourth/sixth port 18. Meanwhile the fifth port 20 directs flow axially along stemshell axis 34 and out bore 36 which may have a curved 90° bend therein through third/seventh outlet port 16.

One will note that of these two flow paths 80,82, the flow path 80 from the second port 14 out the fourth/sixth port 18 has two 90° bends and thus is the more convoluted of the two flow paths 80,82. A straight flow path would be ideal in terms of a higher CV value but due to the geometry involved and the space considerations, bends (or non-straight flow paths 80,82) have been determined to be necessary in many embodiments in order to achieve the desired flow paths 80,82 by the applicant whether having a single or multiple 90° bends or other bends in flow path 80 or 82.

FIG. 4 shows a second flow mode, identified as mode 1.5. The stemshell 24 has been turned 30° relative to the axis 34 so as to align the first port 12 through fourth bore 29 (or other appropriate bore/channel) and a second port 14 through first bore 28 (or other appropriate bore/channel) with the first bore 30 so as to direct fluid from both of those inlet ports 12,14 into internal passage 30 and then out the fourth/sixth port 18 through the second bore 32 (or other appropriate bore/channel) as a first flow path 80. Meanwhile the fifth port 20 directs flow path 82 out the bore 36 (or other appropriate bore/channel) and out third/seventh port 16. The flow from the fifth port 20 proceeds into the stemshell 24 and out the third/seventh port 16 similar to the flow into the fifth port from Mode 1 (the first mode shown in FIG. 3).

With the preferred embodiment, continuing to rotate the stemshell 24 another 30° places the valve in Mode 2 or the third flow position shown in FIG. 5. In this flow configuration, first flow path 80 proceeds from the first port 12 through the fourth port 29 (or other appropriate bore/channel) into the internal passage 30 and then out the second bore 32 (or other appropriate bore/channel) through the fourth/sixth port 18 for a first flow path 80 while second flow path 82 proceeds from the fifth port 24 into a second internal passage 40 of the stemshell and out the third bore 36 (or other appropriate bore/channel) and out the third/seventh port 16.

Figure 8:
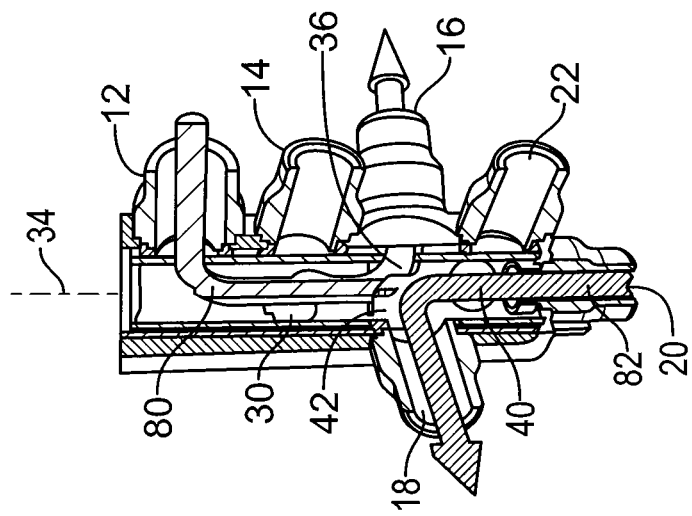
FIG. 8 is a partial cut away view of the valve in FIGS. 1-2 in a sixth flow mode.
Figure 7:
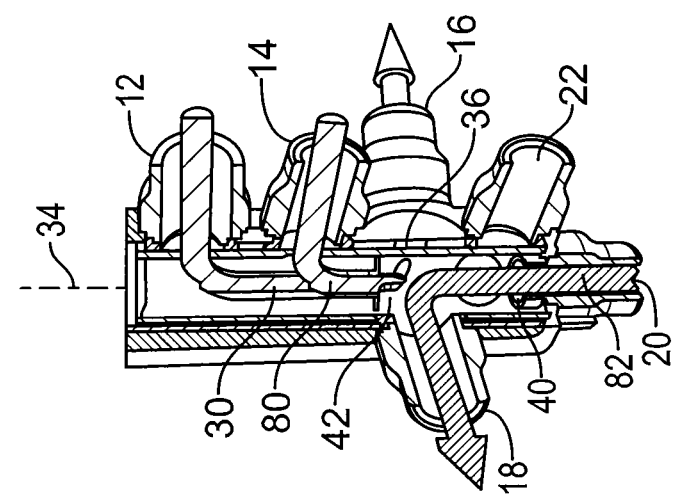
FIG. 7 is a partial cut away view of the valve in FIGS. 1-2 in a fifth flow mode.
Figure 6:
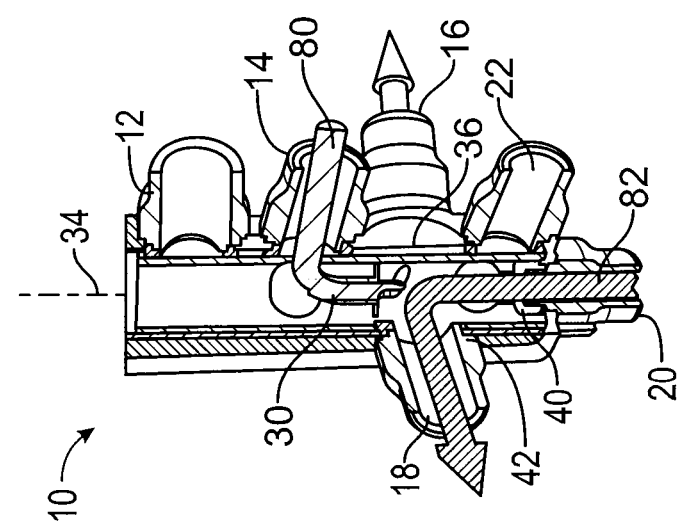
FIG. 6 is a partial cut away view of the valve in FIGS. 1-2 in a fourth flow mode.

Turning the stemshell another 60° places the stemshell in Mode 3 or the fourth flow made whereby the second port 18 directs flow through a fifth bore 42 into the internal passage 30 and out the third/seventh port 16 through a channel such as third channel 36 as a first flow path 80 (or other appropriate bore/channel) which may be the same or different bore utilized for FIGS. 6, 7, and 8 flows. Meanwhile, the second flow path 82 from the fifth port 20 proceeds into internal passage 40 and out the fourth/sixth port 18 such as through third bore 36 (or other appropriate bore/channel) which may be somewhat channel shaped.

Continuing to turn the stemshell 24 another 30° places the valve 10 in Mode 3.5 or the fifth Mode in which a first flow path 80 from the first and second ports 12,14 proceeds through respective bores (28,29, or etc.) into internal passage 30 and out third bore/channel 36 into the third/seventh port 16, while a second flow path 82 from the fifth port 20 proceeds into internal passage 40 and out the bore or channel 32 (or other appropriate bore/channel) through fourth/sixth port 18.

Turning the stemshell 24 another 30° as Mode 4 (which is 180° off the first position shown in FIG. 3), the first port 12 directs a first flow path 80 in through a bore (such as fourth bore 29 or other bore) into internal passage 30 which is then directed out a bore or passage 36 (or other port/channel) through the third/seventh port 16 through internal passage 30. Meanwhile the fifth port 20 directs a second flow path 82 through internal passage 40 out second bore or passage 32, (or other bore/passage), into the fourth/sixth port 18.

The final Mode 5 is shown as being 90° offset from both the Mode 1 and Mode 4 so that continual turning provides this configuration or Mode 5 which is the seventh position whereby flow from the second port 14 proceeds into the internal passage 30 from an appropriate bore (such as 50) as a first flow path 80 and then is directed out the third/seventh port 16 such as through an appropriate bore or channel 52. Meanwhile, the fifth port 20 directs flow into the chamber 40 and out bore 54 (or other appropriate bore/channel) through the eighth port 22.

Figure 9:
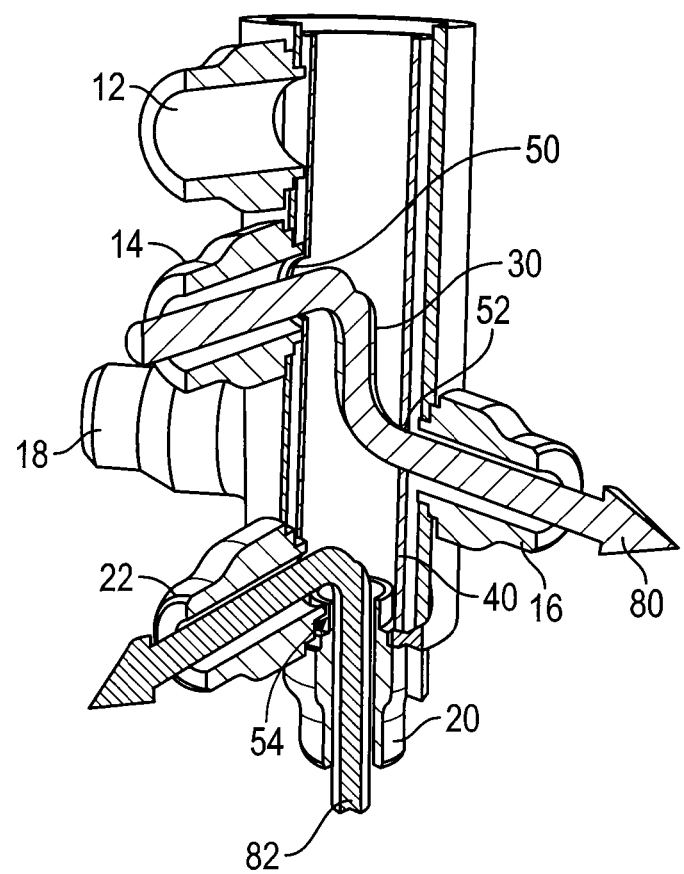
FIG. 9 is a partial cut away view of the valve in FIGS. 1-2 in a seventh flow mode.

Many of the ports 12-22 are blocked off during the various modes except fifth port 20 and third/seventh port 16. For instance, there is no flow through the eighth port 22 in any of the modes except for Mode 5 (the seventh flow position of FIG. 9). In all the flow positions except for the Mode 5, the seventh flow position, there is flow out of both the third/seventh port 16 as well as the fourth/sixth port 18. In Mode 5 there is no flow out of fourth/sixth port 18. Furthermore, in Mode 1, the first flow position, and Mode 3, the fourth flow position, there is no flow into the first port 12. In Mode 2, the third flow position, as well as Mode 4, the sixth flow position, there is no flow into the second port 14.

If there is no flow, the selected ports are blocked off in these various flow configurations. Leakage of no more than 5 milliliters per minute is permitted when the valve is initially provided to the customer for many embodiments, between no more than 10 millimeters per minute at the end of the life of valve 10.

Flow path 80 from first and second inputs of either or both of the first or second ports 12,14 does not mix with the flow path 82 starting from the fifth inlet port 24 in any of the configurations. There are separate flow paths 80,82 provided by the valve 10 in these various configurations, with the possible exception of the allowable leakage as described above.

Figure 11:
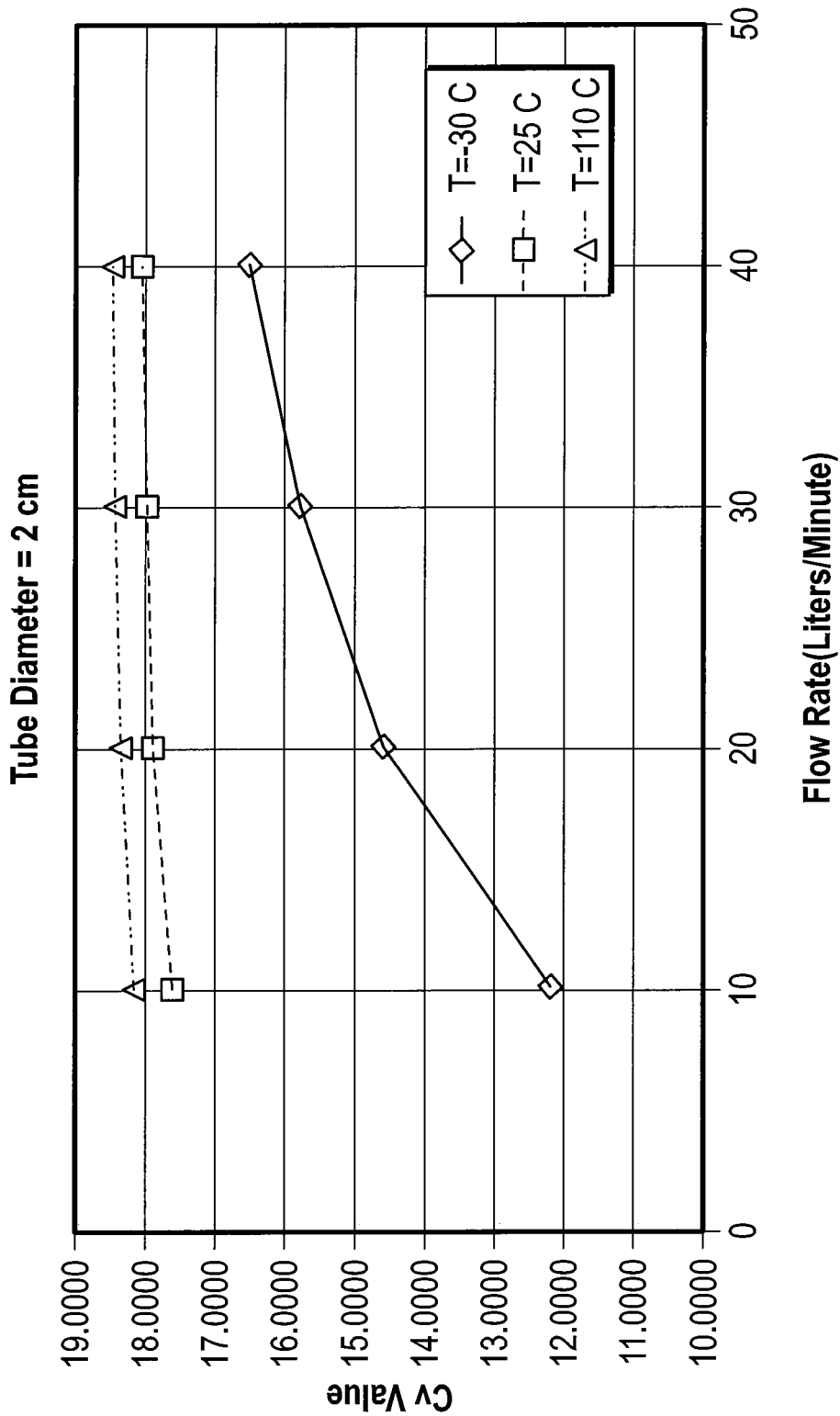
FIG. 11 is a graph of CV value vs. flow rate at different temperatures for a specified stemshell diameter.

The applicant attempted to evaluate the design of the valve 10 under valve diameter, flow rate and temperature considerations. FIG. 11 shows temperatures taken at −30° C., −25° C. and 110° C. which provides similar CV values vs. flow rate curve appearances for the various diameters. Although a two centimeter diameter of the stemshell 24 is illustrated, if a smaller diameter such as 1.8 cm is utilized, the CV values go down so that instead of the 110° temperature line being at 18, it is less than 12 and instead of starting at 12 for the −30° C. it starts at about 8. At a 2.3 centimeter diameter the CV value of the −30° C. curve starts at about 16 while the 110° C. line starts at about 24 but the shape of the curves is similar. A diameter of 2.0 centimeters provides a CV value of over 13 in all cases except for the −30° value at 10 liters per minute, but it is over 13 at 20 liters. The CV values are affected by the 90° bend(s) construction of the stemshell flow paths. Straight flow paths for valve constructions may be practical for many embodiments.

The applicant was able to achieve the desired physical dimension limitations of being within 50 millimeters in depth, 70 millimeters in width and 165 millimeters in height and still provide a three or four pin connection 60 for use by the actuator 62.

Figure 10:
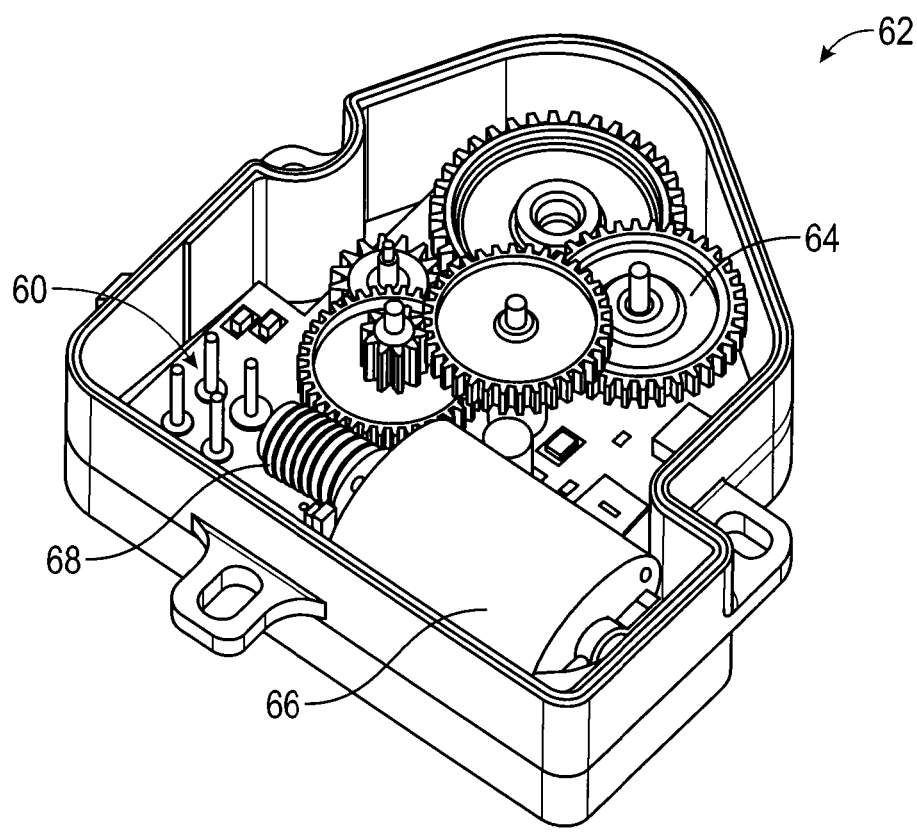
FIG. 10 is a bottom view of the actuator shown in FIGS. 1 and 2.

FIG. 10 shows the actuator 62 with various gears 64 to provide the desired rotational positioning of the stemshell 24 relative to housing 26 such as with a motor 66 which could have a worm gear 68 to drive the gear 64 and possibly a top gear 68 operated by the actuator 62 and connected to the operator 70 which rotates the stemshell 24 relative to housing 26 for the desired angular position shown in FIG. 12 to thus achieve the various flow paths shown in FIGS. 3-9.

Flow paths 80,82 may be colinear in opposite directions for many flow positions through at least a portion, if not all, of stemshell 24.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

What is claimed is:

1. A fluid control valve comprising:
   a housing having inlet ports selected from at least the group of a first and a second inlet port, and outlet ports selected at least from the group of a first and second outlet port;
   a stemshell having a substantially cylindrical exterior received within the housing, wherein rotation of the stemshell relative to the housing selectively provides fluid communication from selected inlet ports to selected outlet ports, said stemshell rotatable about a longitudinal axis of the stemshell;
   said first inlet ort aligned with the longitudinal axis and providing fluid communication to one of the first and second outlets in all but one selected rotational position of the stemshell relative to the housing;
   said second inlet port located along an exterior surface of the housing spaced radially from the longitudinal axis of the stemshell; and
   the first and second inlet orts provide separated flows to respective outlet orts in all selected rotational positions of the stemshell relative to the housing;
   a third inlet port located along the exterior surface of the housing in linear disposition with the second inlet port, with a line between the second and third inlet ports on the exterior surface of the housing to be parallel to the longitudinal axis; and wherein at least one of the second and third inlet ports is provided in fluid communication selectively to at least one of the first and second outlet ports in all rotational positions of the stemshell relative to the housing.

2. A fluid control valve comprising:
   a housing having inlet ports selected from at least the group of a first and a second inlet port, and outlet ports selected at least from the group of a first and second outlet port;
   a stemshell having a substantially cylindrical exterior received within the housing, wherein rotation of the stemshell relative to the housing selectively provides fluid communication from selected inlet ports to selected outlet ports, said stemshell rotatable about a longitudinal axis of the stemshell;
   said first inlet port align with the longitudinal axis and providing fluid communication to one of the first and second outlets in all but one selected rotational position of the stemshell relative to the housing;
   said second inlet port located along an exterior surface of the housing spaced radially from the longitudinal axis of the stemshell; and
   the first and second inlet orts provide separated flows to respective outlet ports in all selected rotational positions of the stemshell relative to the housing;
   a third inlet port located along the exterior surface of the housing in linear disposition with the second inlet port, with a line between the second and third inlet ports on the exterior surface of the housing to be parallel to the longitudinal axis; and wherein the second inlet port is provided in fluid communication selectively to the first outlet port in a first rotational positions of the stemshell relative to the housing with no fluid communication of the third inlet port with either the first or the second outlet port, and the second outlet port not in fluid communication with an inlet port.

3. The fluid control valve of claim 2 wherein both the second and third inlet ports are provided in fluid communication to the first outlet port in a second rotational position of the stemshell relative to the housing, and the second outlet port not in fluid communication with an inlet port.

4. The fluid control valve of claim 3 wherein the third inlet port is selectively provided in fluid communication to the first outlet port in a third rotational position of the stemshell relative to the housing with no fluid communication of the second inlet port with either the first or the second outlet port, and the second outlet port not in fluid communication with an inlet port.

5. The fluid control valve of claim 4 wherein the second inlet port is selectively provided in fluid communication with the second outlet port in a fourth rotational position of the stemshell relative to the housing with no fluid communication of the third inlet port with either the first or the second outlet port, and the first outlet port is not in fluid communication with an inlet port.

6. The fluid control valve of claim 5 wherein both the second and third inlet ports are selectively provided in fluid communication with the second outlet port in a fifth rotational position of the stemshell relative to the housing, and the first outlet port is not in fluid communication with an inlet port.

7. The fluid control valve of claim 6 wherein the third inlet port is selectively provided in fluid communication with the second outlet port in a sixth rotational position of the stemshell relative to the housing with no fluid communication of the second inlet port with either the first or the second outlet port, and the first outlet port is not in fluid communication with an inlet port.

8. The fluid control valve of claim 7 further comprising a third outlet port, wherein one of the second and third inlet ports are selectively provided in fluid communication with a selected one of the first and second outlet ports in a seventh rotational position of the stemshell relative to the housing with no fluid communication of a nonselected one of the second and third inlet ports with either the first or the second outlet port, and the first inlet port is in fluid communication with the third outlet port.

9. The fluid control valve of claim 8 wherein the first and second rotational positions of the stemshell are at least 30 degrees apart.

10. The fluid control valve of claim 9 wherein the second and third rotational positions of the stemshell are at least 30 degrees apart.

11. The fluid control valve of claim 10 wherein the third and fourth rotational positions of the stemshell are at least 60 degrees apart.

12. The fluid control valve of claim 11 wherein the fourth and fifth rotational positions of the stemshell are at least 30 degrees apart.

13. The fluid control valve of claim 12 wherein the fifth and sixth rotational positions of the stemshell are at least 30 degrees apart.

14. The fluid control valve of claim 13 wherein the sixth and seventh rotational positions of the stemshell are 90 degrees apart.

15. The fluid control valve of claim 14 wherein the seventh and first rotational positions of the stemshell are 90 degrees apart.

16. The fluid control valve of claim 7 wherein the third outlet port is linearly disposed on an exterior surface of the housing together with the second and third inlet ports.

17. The fluid control valve of claim 16 wherein a line connecting the first and second outlets at the exterior surface of the housing is non-parallel with the longitudinal axis.

18. The fluid control valve of claim 17 wherein the second and third inlets are spaced farther than the first, second and third outlets from the first inlet in a direction along the longitudinal axis of the stemshell, and the first and second outlets are spaced farther than the third outlet in a direction along the longitudinal axis of the stemshell.

* * * * *

UNITED STATES PATENT AND TRADEMARK OFFICE
CERTIFICATE OF CORRECTION

| | |
|---|---|
| PATENT NO. | : 11,796,073 B2 |
| APPLICATION NO. | : 17/580156 |
| DATED | : October 24, 2023 |
| INVENTOR(S) | : Kyle Svejcar and James Pearson |

Page 1 of 1

It is certified that error appears in the above-identified patent and that said Letters Patent is hereby corrected as shown below:

In the Claims

Claim 1, Column 6, Line 33: "the first and second inlet orts provide separated flows to" should read --the first and second inlet ports provide separated flows to--

Claim 1, Column 6, Line 34: "respective outlet orts in all selected rotational positions" should read --respective outlet ports in all selected rotational positions--

Claim 2, Column 6, Line 56: "said first inlet port align with the longitudinal axis and" should read --said first inlet port aligned with the longitudinal axis and--

Claim 2, Column 6, Line 63: "the first and second inlet orts provide separated flows to" should read --the first and second inlet ports provide separated flows to--

Signed and Sealed this
Twenty-eighth Day of November, 2023

Katherine Kelly Vidal
*Director of the United States Patent and Trademark Office*